(12) United States Patent
Litster et al.

(10) Patent No.: US 8,086,531 B2
(45) Date of Patent: Dec. 27, 2011

(54) VIRTUAL CREDIT CARD TERMINAL AND METHOD OF TRANSACTION

(76) Inventors: Gregory J. Litster, Newstead (AU);
Craig A. Kenny, Willowbank (AU);
Tony M. Steele, Townsville (AU)

(*) Notice: Subject to any disclaimer, the term of this patent is extended or adjusted under 35 U.S.C. 154(b) by 1526 days.

(21) Appl. No.: 09/955,544

(22) Filed: Sep. 17, 2001

(65) Prior Publication Data
US 2003/0018579 A1    Jan. 23, 2003

(30) Foreign Application Priority Data
Jul. 19, 2001  (AU) ........................................ PR6477

(51) Int. Cl.
G06Q 40/00  (2006.01)
(52) U.S. Cl. ............................................. 705/40
(58) Field of Classification Search .................. 705/26, 705/40, 41
See application file for complete search history.

(56) References Cited

U.S. PATENT DOCUMENTS

| | | | | |
|---|---|---|---|---|
| 4,713,760 A | * | 12/1987 | Yamada et al. | 705/17 |
| 5,790,677 A | * | 8/1998 | Fox et al. | 705/78 |
| 5,991,738 A | * | 11/1999 | Ogram | 705/26 |
| 6,282,522 B1 | * | 8/2001 | Davis et al. | 705/41 |
| 6,434,403 B1 | * | 8/2002 | Ausems et al. | 455/556.2 |
| 6,847,953 B2 | * | 1/2005 | Kuo | 705/75 |
| 6,980,970 B2 | * | 12/2005 | Krueger et al. | 705/39 |
| 2002/0133468 A1 | * | 9/2002 | Mertens | 705/75 |

FOREIGN PATENT DOCUMENTS

| WO | WO 9604618 A1 | * | 2/1996 |
|---|---|---|---|
| WO | WO98/49658 | | 11/1998 |

* cited by examiner

*Primary Examiner* — Olabode Akintola
(74) *Attorney, Agent, or Firm* — Davis Wright Tremaine LLP; Barry L. Davison

(57) ABSTRACT

The present invention provides a method of making a secure financial transaction over the internet comprising: a virtual credit card terminal (VCT) having a credit card means reader, a digital processing device operatively associated with said credit card means reader and encoding transaction programs that allows opening of an interactive terminal window for processing of the transaction, and wherein said virtual credit card terminal is registered with a VCT gateway.

15 Claims, 1 Drawing Sheet

VIRTUAL CREDIT CARD TERMINAL AND METHOD OF TRANSACTION

FIELD OF INVENTION

The present invention relates to a method of transaction using a credit or debit card. The present invention has particular but not exclusive application for use by a consumer for making a transaction over the internet. Reference to credit card includes debit card or any suitable card which can be used to perform a transaction. Reference to a bank is also a reference to other bank type financial institutions. Reference to a virtual credit card terminal is a reference to a credit card terminal that is computer based and can transact a credit card payment over the internet.

CROSS-REFERENCE TO RELATED APPLICATIONS

This application claims priority under 35 U.S.C. §119(a)-(d) to Australian Patent Application Number PR6477, entitled VIRTUAL CREDIT CARD TERMINAL AND METHOD OF TRANSACTION, filed Jul. 19, 2001.

BACKGROUND OF THE INVENTION

With the offer and sale of goods over the internet, customers are given the payment option of providing their credit card details online at a payment window on the merchant's website. Customers however have been reluctant to provide their credit card details over the internet because of security fears that their details will not remain confidential and be fraudulently used. Also merchants have been concerned about the issue of liability in circumstances where their customer's credit card details are fraudulently used.

Consequently merchants have looked at ways of providing a secure means for customers to provide their details. Despite various attempts including encrypting information or generating specific transaction codes from user identification keys to improve security, most methods still rely on the customer providing their credit card details to the merchant. These methods however have met with limited success because of the lack of customer confidence.

Therefore, there is a need in the art to provide a method of making a transaction with a credit card over the internet that addresses at least in part the aforementioned problem regarding security and confidentiality.

SUMMARY OF THE INVENTION

In one aspect the present invention broadly resides in a virtual transaction terminal including
a recognition means;
a digital processing device operatively associated with the recognition means; and
transaction programs adapted to run on said digital processing device;
wherein an interactive terminal window is opened with the running of the transaction programs, said interactive terminal window enables data including a personal identification code to be entered, said transaction programs enables processing of data from the recognition means and the interactive terminal window for the purposes of effecting a transaction.

The recognition means may be any suitable means for recognising a unique sign or key such as a swipe card, dallas key, smart card, proximity card, barcode, and fingerprint. Preferably the means is a card reader adapted to read a card with data encoded on a magnetic strip. More preferably the card reader is adapted to read credit and debit cards. The card reader may be portable or form an integral part of the hardware of the digital processing device. In one embodiment the card reader is portable and can be operatively connected to different digital processing devices. In a preferred form the card reader is operatively associated with only one digital processing device.

The digital processing device preferably includes a screen, processing means and an input means. The processing means is preferably a suitable form of processor. The input means may be a key board, a card reader, a mouse, a trackball, a light pen or a serial port for connecting to some other input device. In a preferred embodiment the digital processing device is a computer system including a microprocessor, mouse/keyboard and a monitor. Alternatively the digital processing device may be a telephone (landline) and handheld wireless devices such as mobile phones, personal digital assistants (PDA), pagers, smartphones, and communicators. The telephones and hand held devices preferably include a screen, keypad and a suitable processor. Hand held devices preferably access the internet using WAP technology. The digital processing device may alternatively be an interactive television including an internet connection, processor, and a suitable input device such as a keyboard. In a further alternative the digital processing device may be any suitable internet-connected device such as a household appliance with a screen, processor, and input device such as a key pad. Suitable household appliances include refrigerators which can be used to order goods over the internet for restocking purposes.

The terminal window is preferably coded for in a software application. With respect to a computer system, the application is preferably an applet such as a Java or Javascript applet whereby a terminal window is displayed on a monitor screen. With reference to wireless devices WAP technology is preferably used with WML, HTML and XML languages. In one embodiment WMLScript may be used to launch or open a terminal window on a screen.

The identification code is preferably unique and specific for the sign or key. Where the transaction is a credit card transaction, the identification code is preferably a personal identification number specific for the credit card. The transaction programs provide a terminal window that serves as an interactive portal with websites on the internet. These websites include merchant websites and VCT gateway.

The VCT gateway is defined as a server or host that interacts with the merchant and purchaser to form a VCT transaction request. The VCT gateway also interacts with suitable boundary protocols and programs with each bank and financial institution to pass transaction information between the VCT gateway and bank.

An advantage of the virtual transaction terminal is that two levels of security must be satisfied to effect a transaction. That is, the transactor must have the sign or key physically present with them and knowledge of the unique identification code to carry out the transaction.

In another aspect the invention broadly resides in a recognition means adapted to read machine readable information from a substrate and communicating said information to a digital processing device wherein the recognition means is operable only with a digital processing device operationally associated with a digital certificate which is used in each transaction.

Said recognition means is preferably a card reader that is capable of reading a card encoding information. More preferably the recognition means is a card reader able to read a card with a magnetic strip. The substrate is preferably a card that encodes information in a magnetic strip such as a swipe card but alternatively the card may be a Smart Card or other suitable card.

The digital certificate is preferably a unique generated code. The complexity of the digital certificate is determined by the desired level of security. By way of example, the digital certificate is preferably a unique code generated from the serial number of the recognition means, serial number of the operating system, serial number of the hard disk (in the case of a computer system) and a randomly generated number from application of an algorithm to create a unique key.

The digital certificate is preferably used in each credit card transaction thereby identifying the recognition means, operating system and hard disk (in the case of a computer system) used in each transaction. If the digital certificate is not the same certificate as is recorded at the virtual credit card terminal (VCT) gateway then the transaction will not be processed.

The invention in a further aspect broadly resides in a method of installing a virtual credit card terminal where a digital processing device is operatively associated with a recognition means including the following steps:
  obtaining virtual credit card terminal software, the recognition means for reading machine-readable information from a credit card, and a seed key;
  installing said recognition means to the digital processing device;
  initialising said digital processing device with virtual credit card terminal (VCT) gateway;
  generating a digital certificate by the VCT gateway using information provided by the digital processing device; and
  installing digital certificate in said digital processing device by use of the seed key.

The virtual credit card terminal software, the recognition means, and seed key are preferably provided by a VCT gateway and supplied as separate individual packages for purposes of security. The virtual credit card terminal software, the recognition means, and seed key are preferably provided by VCT gateway after they have approved registration of the end user. The personal details such as name and address of the end user, the serial number of the recognition means and a copy of the seed card are preferably recorded as part of the registration details of the end user and are used to confirm whether the correct end user received the packages during installation and provide personal details for purposes of delivery of purchased goods upon suitable authorisation. The virtual credit card terminal software is preferably installed on the digital processing device as part of the obtaining step. The virtual credit card terminal software may alternatively be pre-installed on a new digital processing device.

The recognition means is preferably installed by physically connecting the recognition means to the digital processing device. The recognition means may alternatively be integral with and form part of the digital processing device. When the recognition means has been connected, the recognition means communicates with the digital processing device providing it with the serial number of the recognition means. The communication between the recognition means and the digital processing device is preferably encrypted for security purposes.

Initialising the digital processing device with the VCT gateway preferably involves providing the VCT gateway with the serial number of the recognition means, serial number of the operating system, serial number of the hard drive and the name and address of the end user. The VCT gateway confirms the serial number of the recognition means and the name and address of the end user as the end user who was provided with that particular recognition means.

VCT gateway then generates a digital certificate. As mentioned above the digital certificate is preferably based on the serial number of the recognition means, serial number of the operating system, serial number of the hard drive and a randomly generated number derived from an algorithm involving the above three serial numbers. The generated digital certificate is unique to the end user and is used in each transaction.

The digital certificate is encrypted using a copy of the seed key provided to the end user. The encrypted digital certificate is then sent to the end user who then decrypts and installs the digital certificate in the digital processing device with the use of their copy of the seed key. The seed key is preferably used like the credit card by passing it through the recognition means.

In another aspect the invention broadly resides in a method of making a financial transaction over the internet including:
  election by the purchaser to pay for selected items from a merchant by credit card means using the virtual credit card terminal (VCT), said virtual credit card terminal includes credit card means reader, a digital processing device operatively associated with said credit card means reader and encoding transaction programs that allows opening of an interactive terminal window for processing of the transaction, said virtual credit card terminal is registered with VCT gateway;
  providing the purchaser with a transaction number from said VCT gateway, merchant identification and amount to transact from the merchant, said merchant is registered with said VCT gateway;
  said purchaser enters details of credit card means into the virtual credit card terminal and forms a VCT transaction request;
  sending the VCT transaction request to VCT gateway;
  processing the VCT transaction request by the VCT gateway and forming a bank transaction request;
  sending the bank transaction request from the VCT gateway to a bank;
  processing the bank transaction request from sending advice from the bank to the VCT gateway whether the bank transaction request has been approved; and
  sending advice from the VCT gateway to the merchant and the purchaser whether the transaction has been approved.

If the transaction has been approved VCT gateway may provide a transaction authentication code (TAC) to both the merchant and the purchaser.

The method may also include the step of the virtual credit card terminal providing a receipt to the purchaser.

The method may also include the steps of the virtual credit card terminal providing the merchant with the transaction authentication code and or the delivery address details of the purchaser. The receipt of the transaction authentication code from the purchaser to the merchant confirms to the merchant that the purchaser has been notified of the transaction approval. The merchant may then provide a receipt to the purchaser.

Credit card means is a reference to a credit card, debit card, or any suitable device encoding data and facilitating a financial transaction. Bank is a reference to banks, credit providers such as VISA, and other financial institutions.

The merchant preferably obtains the transaction number from said VCT gateway and then provides it to the purchaser.

The method may be used at the point of purchase such as at the customer's home. The phrase, "point of purchase", used in this specification refers to a physical location remote from a location where the merchant's items are displayed for sale such as the merchant's website or store. In this case the customer will have the virtual credit card terminal set up in his home computer system.

The method may also be used at the point of sale such as at a retail store. The "point of sale" reference is used in the specification to refer to a physical location where the items are displayed for sale such as at the merchant's store. In this case the retailer will have the virtual credit card terminal set up in their store and the customer will pass his or her credit card through the operationally associated credit card reader.

The method requires the merchant to be registered with VCT gateway. If VCT gateway approves registration of the merchant they will provide them with a unique merchant identification code which would be used in all transactions using the virtual credit card terminal. It is necessary that the purchaser be registered with the VCT gateway where payment occurs at the point of purchase as described above. It is not necessary that the purchaser be registered with VCT gateway where payment occurs at the point of sale. At the point of sale the merchant must register his virtual credit card terminal with VCT gateway in addition to registering as a merchant. That is each virtual credit card terminal must be registered as described above.

The VCT transaction request preferably includes information that validates whether the request was made by the registered user and with the recorded card reader, operating system and hard disk (in the case of a computer system), and verifies whether the merchant is the recorded merchant who requested that unique transaction number.

The VCT gateway preferably serves to collect, reconfigure but not interpret information. In other words the VCT gateway preferably represents information but does not analyse information for transaction approval purposes. Information obtained by VCT gateway is preferably passed onto the banks for processing. The VCT gateway preferably does not perform any banking functions but serves as a clearing house for transactions. The VCT gateway may be a series of stand-alone servers that provide a gateway for valid requests for approval of online transactions. Alternatively VCT gateway may be part of one or more established credit card providers such as VISA or any other type of transactional facilitators. In a further alternative, the VCT gateway may form part of the electronic data processing section of each bank or financial institution.

The VCT gateway interacts with suitable boundary protocols and programs with the electronic data processing sections of each bank and financial institution.

BRIEF DESCRIPTION OF THE DRAWINGS

In order that the present invention be more readily understood and put into practical effect, reference will now be made to the accompanying drawings wherein.

DETAILED DESCRIPTION OF THE PREFERRED EMBODIMENT

Figure 1:
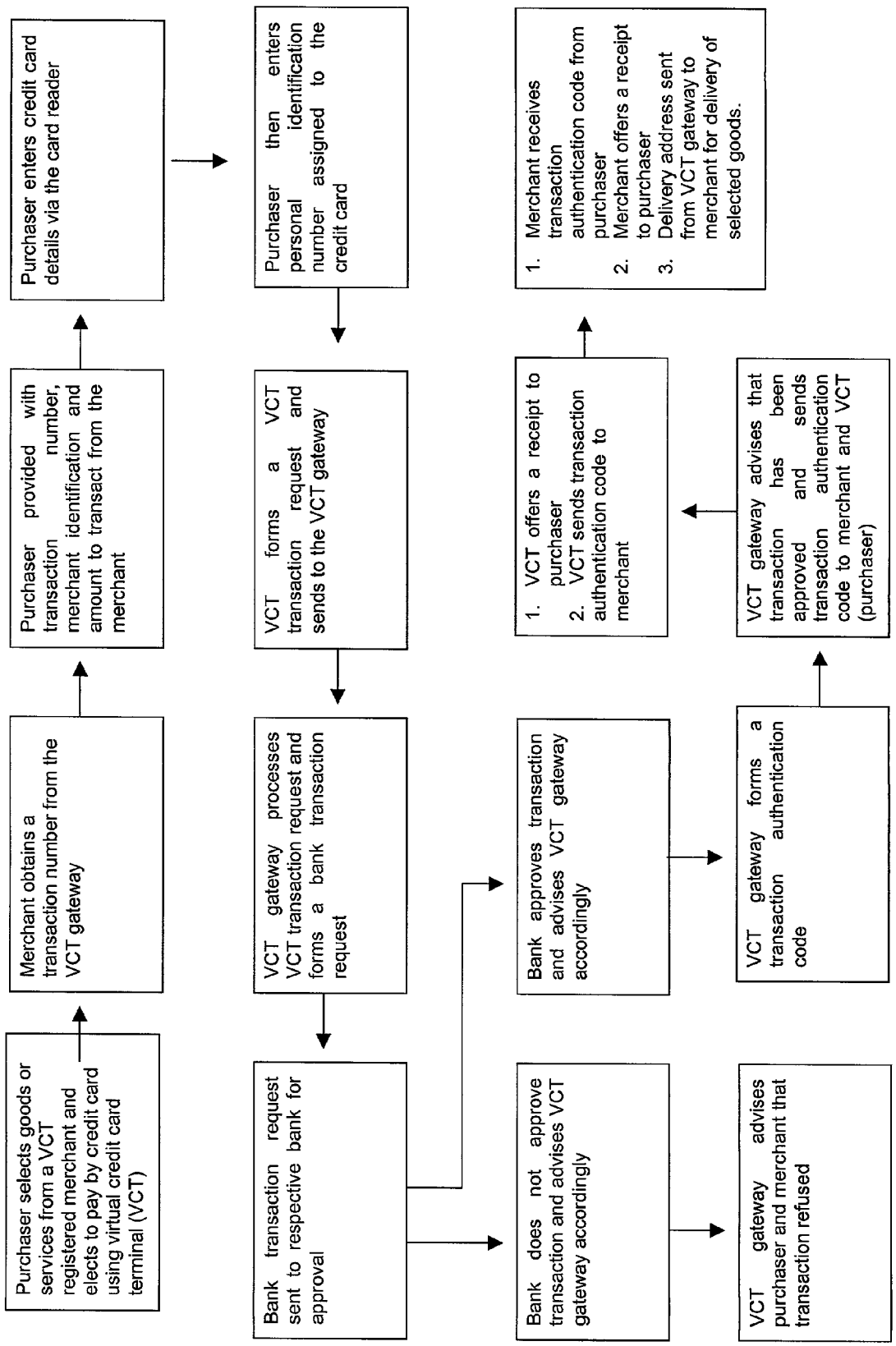
FIG. 1 is a flow diagram of the method of use of making a credit card transaction on line using a virtual credit card terminal.

A preferred embodiment of the present invention concerns a virtual credit card terminal including a card reader operationally associated with a computer system having appropriate virtual credit card terminal software that enables the computer system to communicate with the card reader, registered online merchants, and the virtual credit card terminal (VCT) gateway.

Installation of the virtual credit card terminal is commenced with the registration of the end user by VCT gateway. VCT gateway records the end user's personal details such as name and address for subsequent confirmation of correct installation and possible use as delivery address information. Where the VCT software is not preinstalled and the card reader is not part of the hardware of the computer system, a seed key card, the VCT software and the card reader is provided as individual separate packages from the VCT gateway. The packages are sent separately to provide a level of security as all components are necessary to establish a virtual credit card terminal. Where the VCT software is preinstalled or the card reader forms part of the computer system hardware, only those components that the end user does not have would be provided by the VCT gateway.

The VCT software is initially installed (where not already preinstalled) by placing the VCT software CD or disc into the respective port and following the prompts for auto loading of the programs. During installation a prompt may open on the computer screen to connect the card reader. The card reader is then subsequently physically connected. The computer system communicates with the card reader in an encrypted format and obtains the serial number of the card reader. The computer system then assembles the installation information which includes the serial number of the card reader, serial number of the operating system, serial number of the hard disc and the name and address of the end user. The installation information is then sent to the VCT gateway. The VCT gateway determines whether the end user has the card reader that was initially provided to them by cross-checking the installation information against the VCT gateway records. If the end user has the correct card reader, VCT gateway creates a digital certificate which includes the serial number of the card reader, serial number of the operating system, serial number of the hard drive and a randomly generated number derived by applying an algorithm to the aforementioned serial numbers. The digital certificate is a unique code for the virtual credit card terminal of the end user. The digital certificate is used in each transaction performed from the virtual credit card terminal of the end user. The digital certificate serves as a cross reference check of the veracity of the credit card transaction request.

The digital certificate is encrypted by a copy of the seed key initially provided to the end user. The encrypted digital certificate is then sent to the computer system. Upon receipt of the encrypted digital certificate, the computer system provides a prompt to pass the seed key card through the card reader to decrypt the digital certificate. After the seed key card is passed through the card reader the digital certificate is decrypted and installed into the computer system on the hard disk means for future use. Decryption only occurs where the same seed key that was used to encrypt the digital certificate is used to decrypt the digital certificate. This provides a further level of security that only the correct end user may decrypt and subsequently use their unique digital certificate. After the seed key card has been used for decryption it is no longer required.

The established virtual credit card terminal may be used to pay online with a credit card for selected items from a merchant. It is necessary that the merchant is registered with the VCT gateway in order to obtain a merchant identification code and the necessary programs (including Java applet programs) to effect a transaction with the virtual credit card terminal. The merchant identification code is unique to each merchant but the software is substantially the same for each merchant.

The following example refers to the purchase of goods or services online from a merchant's website from a remote location (point of purchase transaction).

A purchaser selects goods or services online from the merchant's website and places them in a shopping cart. The merchant's website will display the VCT icon as an option for payment of the selected items. If the customer elects to pay with credit card or other suitable card using the virtual credit card terminal, they select or click on the VCT icon. When the VCT icon is selected, the merchant's VCT program will communicate with the VCT gateway and request a unique transaction number. The VCT gateway will process the request and provide the merchant with a unique transaction number.

Upon receipt of the transaction number the merchant's VCT program will launch a Java applet to the web page of the purchaser. The Java applet will interact with the VCT software installed on the purchaser's computer system and launch an interactive image of a credit card terminal. When the merchant's VCT program interacts with the purchaser's VCT software, the transaction information including the unique transaction number, merchant identification code, and amount to be transacted are provided to the purchaser's computer system. The information is displayed on a screen for the purchaser's benefit. The purchaser is then prompted by the VCT program to enter credit card details. If the purchaser wishes to continue with the transaction the purchaser passes their credit card through the card reader. The credit card encodes the relevant credit card details on a magnetic strip on the card. The credit card reader reads the magnetic strip, encrypts the information and provides it to the computer system.

When the credit card details have been successfully entered, the VCT program prompts the purchaser to enter the confidential personal identification number assigned to the particular credit card.

The VCT program then forms a VCT transaction request which includes the merchant identification code, the transaction number, the transaction amount, the credit card number, expiry date of the credit card, the digital certificate and the personal identification number assigned to the credit card. The credit card number provides an indication of the bank or financial institution that is involved with the transaction. The VCT transaction request is encrypted using the end user's digital certificate and then forwarded to the VCT gateway.

The VCT gateway then decrypts the VCT transaction request using the copy of the digital certificate. The successful decryption of the VCT transaction request serves to validate whether the request was sent by the correct end user. Furthermore the digital certificate confirms whether the correct card reader, operating system and hard disk was used in the formation of the request. The VCT gateway verifies whether the merchant identified from the merchant identification code was provided with the same transaction number as set out in the VCT transaction request. The VCT gateway then separates and uses the information in the VCT transaction request to form a bank transaction request containing the necessary information required by the bank or other financial institutions for approval of credit card transactions. The information disclosed in the VCT transaction request is merely reconfigured and passed on to the appropriate bank or other financial institution and not interpreted by the VCT gateway. The VCT gateway does not serve to validate any transactional request but passes this task onto the banks and other financial institutions which are currently performing this function. The VCT gateway thus interacts with suitable boundary protocols and programs with the gateways of each bank and financial institution.

The bank transactional request is processed as per standard procedures and the bank subsequently advises the VCT gateway whether the transaction has been approved. If the transaction has been approved, the VCT gateway forms a unique transaction authentication code. The VCT gateway sends the purchaser and merchant advice that the transaction has been approved and the transaction authentication code. If the transaction has not been approved, the VCT gateway advises the merchant and the purchaser that the transaction has not proceeded and may optionally provide details for the refusal of the transaction.

If the transaction has been approved the virtual credit card terminal offers the purchaser a receipt for the transaction. The purchaser's computer system passes the transaction authentication code received from the purchaser to the merchant. Receipt of the transaction authentication code from the purchaser by the merchant confirms to the merchant that the purchaser has received advice that the transaction has been approved. The merchant then offers the purchaser the merchant's receipt for the transaction.

The delivery details or profile may then be obtained by the merchant after the transaction has been approved directly from the purchaser or from the VCT gateway from previously recorded registration details.

At point of sale transactions where a potential purchaser pays for items whether goods or services at the merchant's premises, the purchaser's credit card may be passed through a card reader operatively associated with a computer system owned by the merchant. The method of performing the transaction is then essentially the same as if it was a point of purchase transaction. It is necessary that the card reader and operatively associated computer system be registered with the VCT gateway. The VCT transaction software preferably plugs into the merchant's point of sale software so that the interaction occurs in a substantially autonomous way. The advantages of point of sale transactions with the virtual credit card terminal is that the merchant at no stage is in possession of the purchaser's credit card details and the processing of the transaction can be performed relatively more quickly with an online system.

The types of transactions that may occur with the virtual credit card terminal include transactions with retail outlets, service providers such as doctors, telecommunications services and hairdressers, and banks and other financial institutions including credit card providers. Transactions may occur with credit cards and other suitable cards that provide a credit facility, cards linked to saving or chequeing accounts for transfer of funds from one account to another or use in the aforementioned transactions.

ADVANTAGES

The advantages of the present invention include:
1. The use of the virtual credit card terminal is complementary and compatible with current credit card systems;
2. The use of the virtual credit card terminal provides a secure means for making an online transaction with a credit card either at the point of purchase or point of sale;
3. The use of the virtual credit card terminal avoids the potential problems associated with disclosing the credit card details to the merchant;
4. The provision of a dedicated card reader operatively associated with a purchaser's home computer system provides the purchaser with the same level of comfort in using their credit card as is currently provided at retail outlets;

5. The virtual credit card terminal may also be used to perform a variety of transactions including transactions between retail outlets, service providers and banks, and bank-to-bank transactions.

VARIATIONS

It will of course be realised that while the foregoing has been given by way of illustrative example of this invention, all such and other modifications and variations thereto as would be apparent to persons skilled in the art are deemed to fall within the broad scope and ambit of this invention as is herein set forth.

Throughout the description and claims this specification the word "comprise" and variations of that word such as "comprises" and "comprising", are not intended to exclude other additives, components, integers or steps.

The invention claimed is:

1. A method of making a financial transaction over the internet, the method comprising:
    receiving at a virtual credit card terminal (VCT) gateway a request for a transaction number from a merchant after the merchant has received an indication from a purchaser that the purchaser has elected to pay for selected items from the merchant by credit card means using a virtual credit card terminal comprising a credit card means reader, and a digital processing device operatively associated with the credit card means reader and encoding transaction programs that allow opening of an interactive terminal window for processing of the transaction, and wherein the virtual credit card terminal is registered with the VCT gateway;
    sending the transaction number from the VCT gateway to the merchant, the merchant providing the purchaser with the transaction number received from the VCT gateway, a merchant identification, and a transaction amount, wherein the merchant is registered with the VCT gateway;
    receiving a VCT transaction request at the VCT gateway from the purchaser, the VCT transaction request comprising the transaction number, the merchant identification, and details of credit card means entered into the virtual credit card terminal by the purchaser;
    determining whether the merchant identification of the VCT transaction request received by the VCT gateway identifies the merchant to which the transaction number was sent by the VCT gateway; and
    when it is determined that the merchant identification of the VCT transaction request received by the VCT gateway identifies the merchant to which the transaction number was sent by the VCT gateway, processing the VCT transaction request by the VCT gateway to facilitate formation of a bank transaction request,
    sending the bank transaction request from the VCT gateway to a bank,
    in response to the bank transaction request, receiving advice sent from the bank to the VCT gateway as to whether the transaction has been approved, and
    sending the advice from the VCT gateway to the merchant and the purchaser.

2. The method of making a financial transaction over the internet of claim 1, further comprising, if the transaction has been approved, providing the merchant and the purchaser with a transaction authentication code.

3. The method of making a financial transaction over the internet of claim 2, further comprising: providing, by said purchaser, the merchant with delivery details; and providing, by said merchant, said purchaser with a merchant receipt.

4. The method of making a financial transaction over the internet as claimed in any one of claims 1 to 3, wherein the virtual credit card terminal is remote from a location where the merchant's items are physically displayed for sale.

5. The method of making a financial transaction over the internet as claimed in any one of claims 1 to 3, wherein the virtual credit card terminal is set up at a retail outlet of the merchant.

6. The method of making a financial transaction over the internet as claimed in any one of claims 1 to 3, wherein the credit card means is a credit card with a data encoded magnetic strip, and wherein the purchaser entered the details of the credit card means into the virtual credit card terminal by passing the credit card through the credit card means reader and separately entering an assigned personal identification number.

7. The method of making a financial transaction over the internet of claim 6, wherein said digital processing device includes a screen, processor and a key pad.

8. The method of making a financial transaction over the internet of claim 6, wherein said digital processing device is an internet-connected telephone, a personal digital assistant, a pager, a communicator, a smartphone, an interactive television, or an interactive household appliance.

9. The method of making a financial transaction over the internet of claim 6, wherein the credit card means reader is operationally associated with an individual digital processing device by a digital certificate which is used in each transaction.

10. The method of making a financial transaction over the internet as claimed in any one of claims 1 to 3, wherein the VCT gateway is a stand-alone server or a server that is part of an electronic data processing section of a bank, credit provider, or other financial institution.

11. The method of making a financial transaction over the internet as claimed in any one of claims 1 to 3, wherein processing of the VCT transaction request by the VCT gateway involves representing information but not analyzing information for transaction approval purposes.

12. A method performed by a virtual credit card terminal (VCT) gateway connected to a financial institution, a merchant computing device associated with a merchant, and a purchaser computing device, the purchaser computing device being operatively coupled to a credit card reader to receive payment information read thereby, the method comprising:
    receiving a request for a transaction number from the merchant computing device after the merchant computing device has received order information from the purchaser computing device;
    in response to the request for a transaction number, sending a transaction number to the merchant computing device, the merchant computing device providing the transaction number, a merchant identification code, and a transaction amount to the purchaser computing device;
    receiving a VCT transaction request from the purchaser computing device, the VCT transaction request comprising the transaction number, the merchant identification code, the transaction amount, and payment information received by the purchaser computing device from the credit card reader, the payment information being associated with an account;
    in response to the VCT transaction request, determining whether the merchant identification code of the VCT transaction request identifies the merchant associated with the merchant computing device to which the transaction number was sent; and when the merchant identification code of the VCT transaction request identifies the merchant associated with the merchant computing device to which the transaction number was sent, sending a payment approval request to the financial institution requesting approval to charge the transaction amount to the account associated with the payment information, in response to the payment approval request, receiving an indication from the financial institution as to whether the request to charge the transaction amount to the account associated with the payment information has been approved, and in response to receiving the indication from the financial institution, informing both the merchant computing device and the purchaser computing device as to whether the request to charge the transaction amount to the account associated with the payment information has been approved.

13. The method of claim 12, further comprising:

storing serial numbers of a plurality of credit card readers and associated end user information in VCT gateway records, each of the plurality of credit card readers having been initially provided to a different end user;

receiving installation information from the purchaser computing device, the installation information including particular end user information associated with a particular end user, and the serial number of the credit card reader operatively coupled to the purchaser computing device;

cross-checking the installation information against the VCT gateway records to determine whether the particular end user information is associated with the serial number of the credit card reader operatively coupled to the purchaser computing device in the VCT gateway records;

when the particular end user information is associated with the serial number of the credit card reader operatively coupled to the purchaser computing device in the VCT gateway records, creating a digital certificate comprising at least a portion of the installation information; and sending the digital certificate to the purchaser computing device.

14. The method of claim 13, wherein the purchaser computing device encrypts the VCT transaction request using the digital certificate, and the method further comprises:

decrypting the VCT transaction request using a copy of the digital certificate, successful decryption of the VCT transaction request indicating the VCT transaction request was sent by the particular end user associated with the digital certificate.

15. The method of claim 14, wherein the installation information further comprises a serial number of an operating system executing on the purchaser computing device, and a serial number of a hard drive of the purchaser computing device, the digital certificate comprises the serial number of the credit card reader operatively coupled to the purchaser computing device, the serial number of the operating system executing on the purchaser computing device, the serial number of the hard drive of the purchaser computing device, and the method further comprises using the digital certificate to confirm that the credit card reader, the operating system, and the hard disk associated with the purchaser computing device were used in the formation of the VCT transaction request.

* * * * *